(12) United States Patent
St. Louis (10) Patent No.: US 8,915,196 B2
(45) Date of Patent: *Dec. 23, 2014

(54) AIRCRAFT TABLE SYSTEM WITH ROLLING SLED MEMBER

(75) Inventor: Matthew St. Louis, Austin, TX (US)

(73) Assignee: St. Louis Designs, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/530,969

(22) Filed: Jun. 22, 2012

(65) Prior Publication Data

US 2012/0325124 A1  Dec. 27, 2012

Related U.S. Application Data

(63) Continuation of application No. 12/493,922, filed on Jun. 29, 2009, now Pat. No. 8,205,562.

(51) Int. Cl.
*A47B 3/00* (2006.01)
*B64D 11/00* (2006.01)
*B64D 11/06* (2006.01)

(52) U.S. Cl.
CPC ........ *B64D 11/00* (2013.01); *B64D 2011/0679* (2013.01)
USPC .............................................. 108/38; 108/42

(58) Field of Classification Search
USPC ......... 108/42, 44, 45, 152, 46, 39, 40, 41, 37, 108/38; 297/147, 146, 145
See application file for complete search history.

(56) References Cited

U.S. PATENT DOCUMENTS

| | | | | | |
|---|---|---|---|---|---|
| 1,116,091 | A | * | 11/1914 | McDonald | 108/44 |
| 1,560,962 | A | * | 11/1925 | Agee | 108/37 |
| 1,753,423 | A | * | 4/1930 | Kroschel | 108/37 |
| 1,768,413 | A | * | 6/1930 | Lyth | 108/37 |
| 1,809,866 | A | * | 6/1931 | Riesche | 108/38 |
| 1,895,558 | A | * | 1/1933 | Spies | 108/37 |
| 2,131,675 | A | * | 9/1938 | Schieber | 108/38 |
| 2,643,420 | A | * | 6/1953 | Schwartz | 49/458 |
| 3,062,544 | A | * | 11/1962 | Viets | 108/38 |
| 3,344,755 | A | * | 10/1967 | Gover | 108/40 |
| 3,583,760 | A | * | 6/1971 | McGregor | 297/145 |
| 4,789,123 | A | * | 12/1988 | Mattsson | 248/240.4 |
| 4,829,910 | A | * | 5/1989 | Lirette | 108/35 |

(Continued)

OTHER PUBLICATIONS

U.S. Patent and Trademark Office, "Notice of Allowance" for U.S. Appl. No. 12/493,932 mailed Feb. 23, 2012.

(Continued)

*Primary Examiner* — Jose V Chen
(74) *Attorney, Agent, or Firm* — Meyertons, Hood, Kivlin, Kowert & Goetzel, P.C.; Eric B. Meyertons (57) ABSTRACT

An aircraft table system includes a table member configured to move reversibly from an undeployed position to a deployed position, coupled to a movable sled member. The system may further include one or more rollers in conjunction with one or more guide rails to facilitate the motion of the sled member. The system may further include a spine member with one or more holes in conjunction with one or more bolts and one or more cables to hold the sled and table members in place. The system may further include a spine member in conjunction with one or more spring reel elements and one or more cables to impart an assisting or resisting force on the sled member.

20 Claims, 7 Drawing Sheets

(56) References Cited

U.S. PATENT DOCUMENTS

| | | | | |
|---|---|---|---|---|
| 5,086,527 A | * | 2/1992 | Takahashi et al. | 108/38 |
| 5,381,738 A | * | 1/1995 | Meyer | 108/42 |
| 5,669,314 A | * | 9/1997 | Grant | 108/48 |
| 5,775,655 A | * | 7/1998 | Schmeets | 108/42 |
| 6,520,091 B1 | | 2/2003 | Dettmers | |
| 6,530,330 B2 | | 3/2003 | Sepe et al. | |
| 7,383,778 B2 | | 6/2008 | Dettmers | |
| 7,395,765 B1 | * | 7/2008 | Dorfman | 108/48 |
| 7,721,657 B2 | * | 5/2010 | Carstensen | 108/44 |
| 7,963,231 B2 | * | 6/2011 | Osborne et al. | 108/44 |
| 8,205,562 B2 | * | 6/2012 | St. Louis | 108/38 |
| 8,205,564 B2 | * | 6/2012 | St. Louis | 108/38 |
| 2003/0188672 A1 | * | 10/2003 | Parent et al. | 108/134 |
| 2010/0319588 A1 | * | 12/2010 | Hanna et al. | 108/44 |

OTHER PUBLICATIONS

U.S. Patent and Trademark Office, "Notice of Allowance" for U.S. Appl. No. 12/493,936 mailed Feb. 23, 2012.

* cited by examiner

AIRCRAFT TABLE SYSTEM WITH ROLLING SLED MEMBER

PRIORITY CLAIM

This application is a continuation application of U.S. patent application Ser. No. 12/493,922, entitled "AIRCRAFT TABLE SYSTEM WITH ROLLING SLED MEMBER" which was filed on Jun. 29, 2009 now U.S. Pat. No. 8,205,562.

BACKGROUND OF THE INVENTION

1. Field of the Invention

The present invention relates to the field of aircraft tables. In particular, embodiments relate to aircraft tables of the deployable type.

2. Description of the Related Art

Many aircrafts are equipped with deployable tables. The tables allow a crew member or passenger to deploy the table when it is needed and stow the table when it is not.

Some aircraft tables use a rack and pinion system as a deployment mechanism. Some such rack and pinion systems are, however, known to experience periodic failure (e.g., jamming) due to in-flight stresses imparted on the system, such as may occur during the takeoff and landing of an aircraft.

U.S. Pat. No. 6,520,091 to Dettmers shows a retractable table using slidable guide members in conjunction with scissor support members and a gas spring for deployment. The Dettmers patent also shows a notched support arm to hold the table in place and support its weight as well as any user-imparted loads.

Slidable guide members may be used to facilitate table deployment. In some cases, however, these deployment mechanisms may be susceptible to adverse frictional forces (e.g., binding), making deployment difficult. Furthermore, a notched arm may create a stress-concentrated pivot point, which may fail in high load situations.

SUMMARY

Described herein are various embodiments of an aircraft table system. In an embodiment, the aircraft table system includes a table member and a sled member. The table member is coupled to the sled member. The table member moves reversibly from an undeployed position to a deployed position.

In an embodiment, an aircraft table system includes rollers coupled to a sled member and guide rails. The rollers are arranged in sets and roll along the guide rails to allow relative translating motion between the sled member and the guide rails.

In some embodiments, an aircraft table system includes a spine member. When the table member is adjusted to a partially deployed position, movable bolts on the sled member are received by holes in the spine member such that the sled member and the coupled table member are at least partially supported by the spine member on the received bolts. Cables may be coupled between the bolts and the table member such that when the table member is adjusted from a deployed position to an undeployed position, the bolts are pulled from the corresponding holes in the spine member, freeing the sled member to move relative to the spine member. In certain embodiments, system elements, such as bolts and guide rails, are arranged symmetrically.

In an embodiment, an aircraft table system includes a table member, a sled member, and a spine member. The sled member moves reversibly on the spine member between a lower sled position and an upper sled position. The system further includes one or more spring elements coupled to the sled member. One or more cables may be coupled between the spine member and the spring elements such that the spring elements impart and/or maintain tension on the cables. The tension may be at least partially converted into an upward force imparted on the sled member.

In some embodiments, the table and sled members are directly connected to one another with hinges. In certain embodiments, the hinges are quick disconnect hinges.

BRIEF DESCRIPTION OF THE DRAWINGS

The present invention will be better understood and other advantages will appear on reading the detailed description of some embodiments taken as non-limiting examples and illustrated by the following drawings in which.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims. Furthermore, the word "may" is used throughout this application in a permissive sense (i.e., having the potential to, being able to), not a mandatory sense (i.e., must). The term "include", and derivations thereof, mean "including, but not limited to". The term "coupled" means directly or indirectly coupled.

DETAILED DESCRIPTION OF ILLUSTRATIVE EMBODIMENTS

In the context of this application, the following terms are defined as:

"Deployed" refers to a position of an element when ready for use.

"Undeployed" refers to a position of an element when not ready for use. For example, a table member is undeployed when it is stowed.

A "member" refers to a constituent part of a system. A "member" may include a plate, link, or other structure of various sizes, shapes, and forms. A member may be a single component or a combination of components coupled to one another. A member may have various regular or irregular shapes. For example, portions of a member may be straight, curved, or a combination of both.

A "cable" refers to any flexible member capable of carrying a tensile load and/or transmitting a pulling load. Examples of a cable include a cord, a rope, a wire, or a bundle of wires.

A "bolt" refers to a movable element. Examples of a bolt include a pin, a bar, rod, or a shaft.

A "hole" refers to any opening, aperture, or receptacle that can receive or accommodate another element.

A "spring element" refers to a member or a device (or a combination of members and/or devices) that has elastic properties. Examples of a spring element include a compression spring, a leaf spring, a coil spring, or an elastic band.

"Spring-loaded" refers to a device having at least one element that can be biased or urged into at least one position by a spring.

A "quick disconnect hinge" refers to a hinge capable of being disconnected without the use of a tool.

A "spine member" refers to any member or combination of members capable of supporting or partially supporting a translating member, component, or assembly. A spine may include one or more rails for guiding a translating element.

A "sheave" refers to any element for guiding, supporting, carrying, or transmitting force to a cable, such as a pulley. A sheave may include, for example, a grooved wheel or roller, or portion thereof, over which a cable may pass.

"Lock" refers to securing or immobilizing an element, or holding an element in place.

"Pivotal" refers to serving as a pivot, or rotational about an axis or point.

Figure 1:
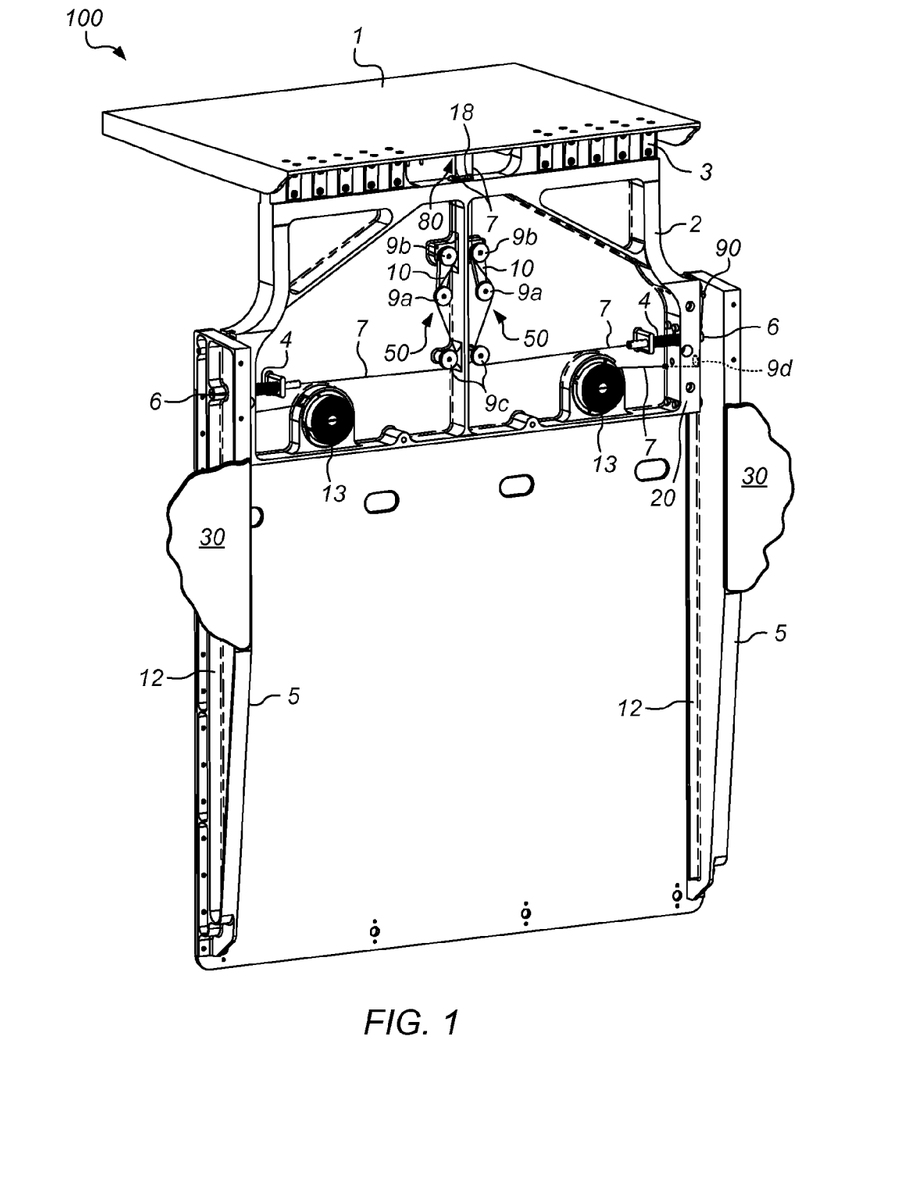
FIG. 1 is a perspective view of an embodiment of an aircraft table system.

FIG. 1 illustrates an embodiment of an aircraft table system. Suitable locations for an aircraft table system include a sidewall of a cabin, rear wall of a cabin, bulkhead, or a pedestal. Aircraft table system 100 includes table member 1 coupled to sled member 2. Sled member 2 is coupled to spine member 5 on roller systems 20 (See also FIG. 4). Spine member 5 may at least partially support sled member 2 and table member 1. Spine member 5 is mounted to structural element 30 (for clarity, only a portion of structural element 30 is shown in FIG. 1). Structural element 30 may be any component or structural element on the aircraft that is suitable for mounting the system, such as a wall of a cabin, a bulkhead, an enclosure, a rail, or a frame. In certain embodiments, structural element 30 is an enclosure in which the table can be stowed when it is not in use.

Figure 6A:
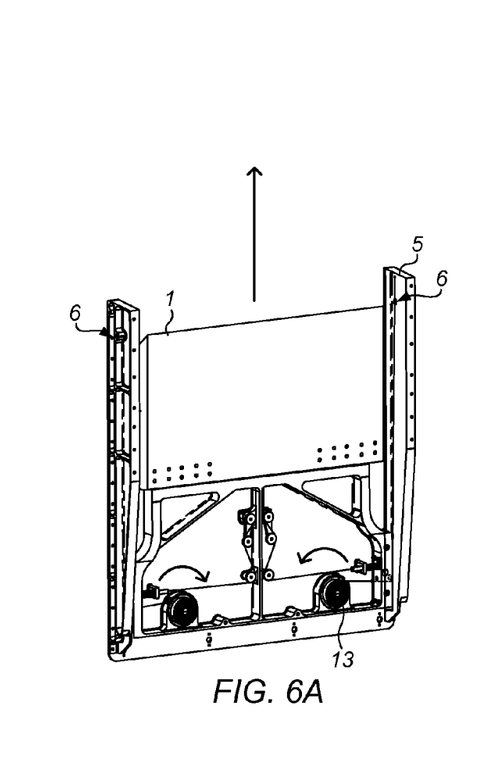
FIGS. 6A-6C are perspective views of an embodiment a table member and a sled member progressively ascending up a spine member.
Figure 6B:
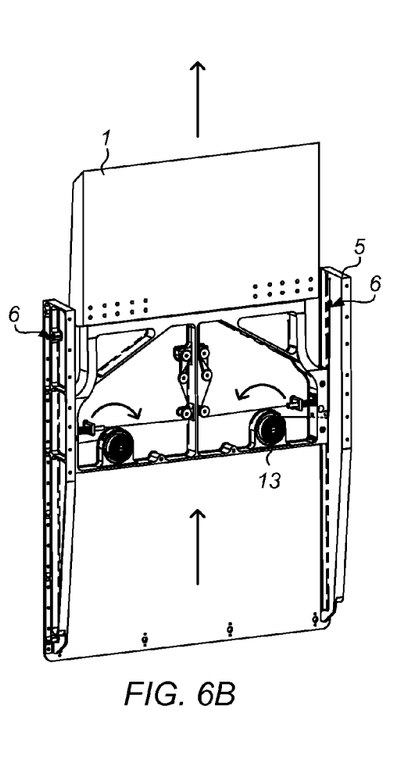
Figure 6C:
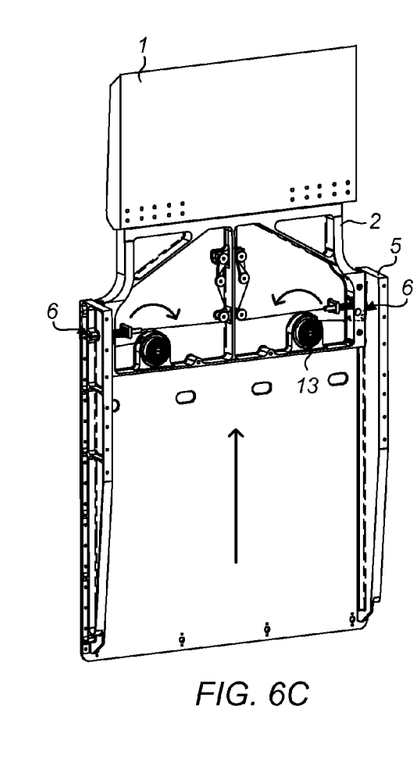
Figure 7A:
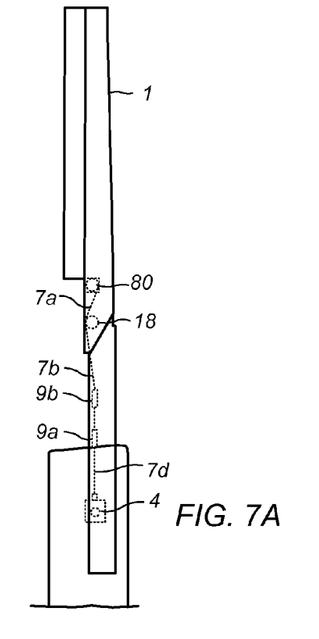
FIGS. 7A-7B are corresponding side and front views of an embodiment of a aircraft table in a raised, undeployed position.
Figure 7B:
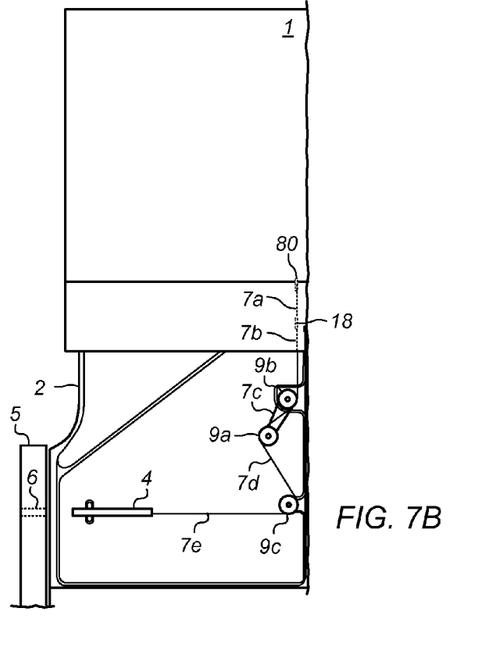
Figure 7C:
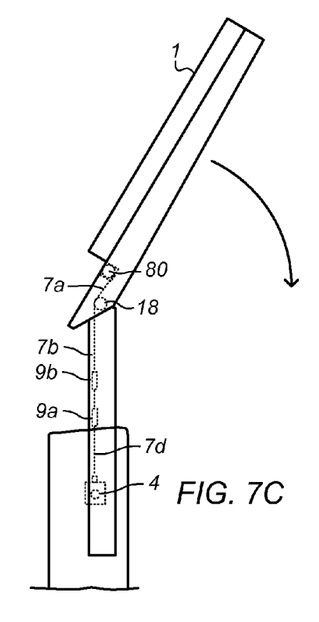
FIGS. 7C-7F are corresponding side and front views of an embodiment of an aircraft table being moved progressively to a deployed position.
Figure 7D:
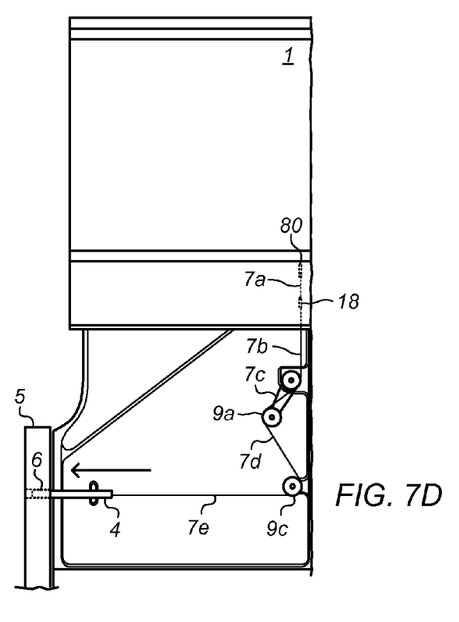
Figure 7E:
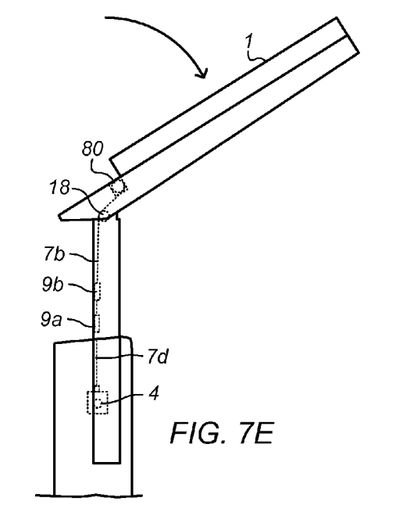
Figure 7F:
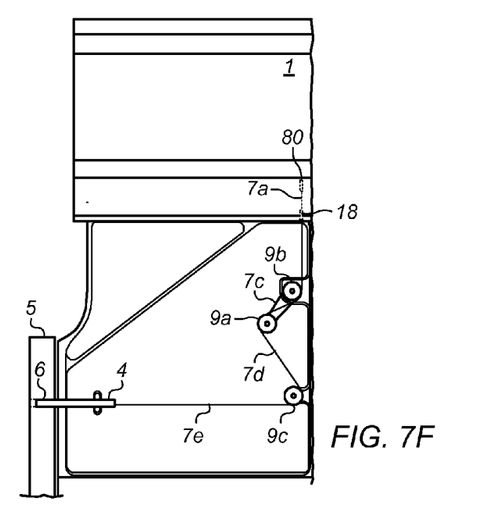
Figure 7G:
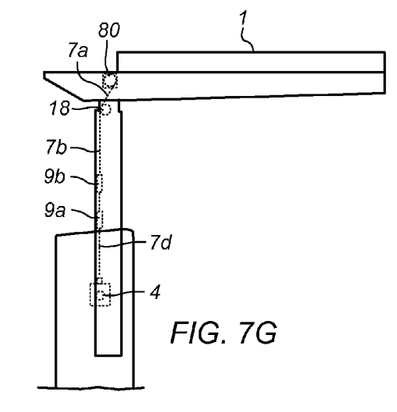
FIGS. 7G-7H are corresponding side and front views of an embodiment of an aircraft table in a deployed position.
Figure 7H:
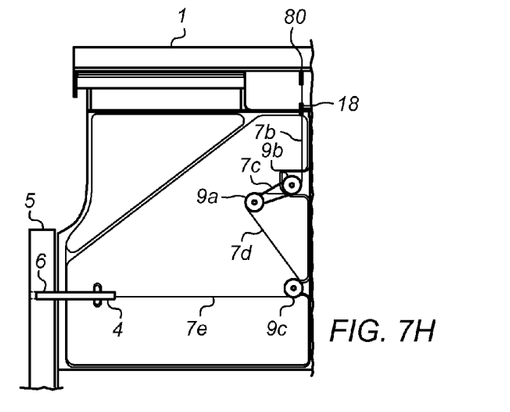
Figure 8A:
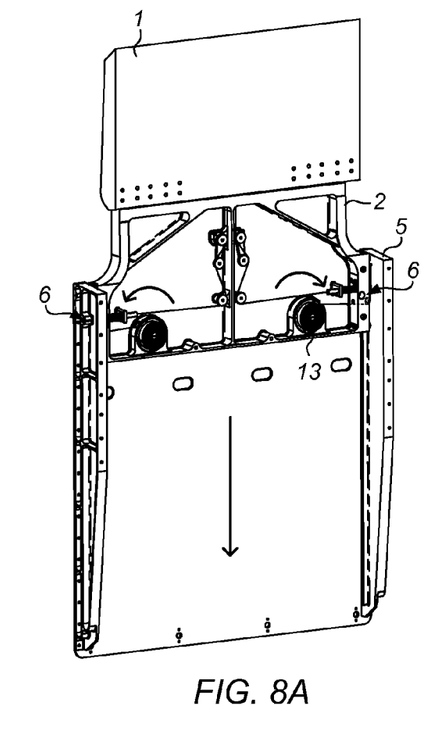
FIGS. 8A-8C are perspective views of an embodiment of a table member and a sled member progressively descending down a spine member.
Figure 8B:
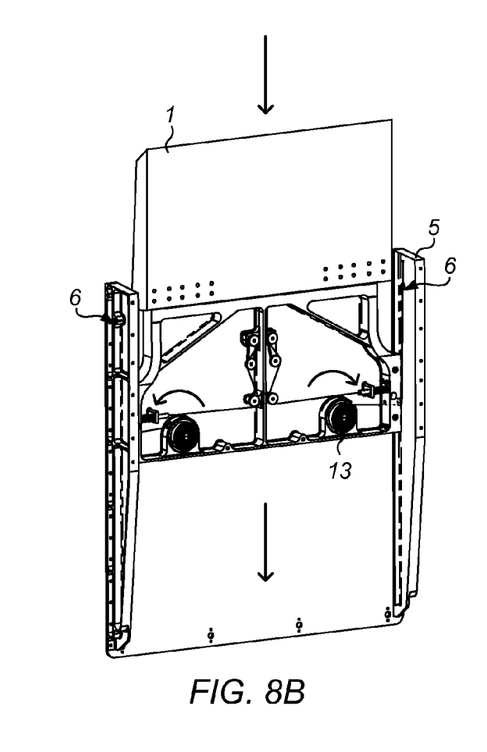
Figure 8C:
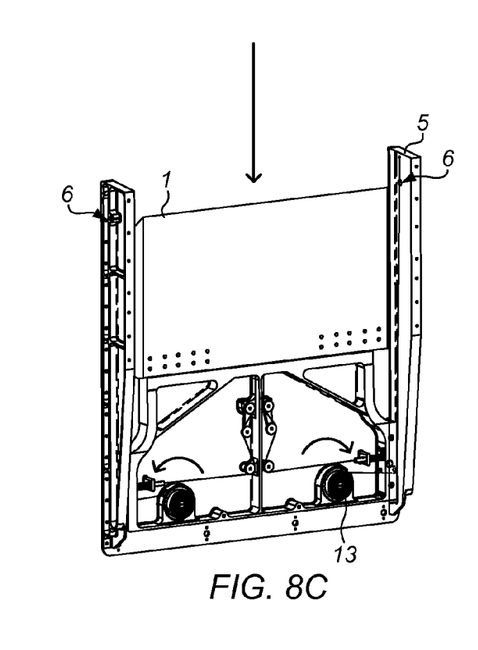

Table member 1 may move reversibly from an undeployed position (such as the stowed position shown in FIGS. 6A and 8C, or the raised vertical position shown in FIGS. 7A and 7B) to a deployed position (such as shown in FIGS. 1 and 7G-7H). In certain embodiments, a deployed position of the table member 1 is substantially horizontal. Sled member 2 may move reversibly between a lower sled position and an upper sled position (such as illustrated in FIGS. 6 and 8). In the embodiment shown in FIGS. 7A-7H, 6, and 8, sled member 2 translates generally up and down on spine member 5, and table member 1 is hinged to sled member 2.

Spine member 5 of aircraft table system 100 includes a pair of guide rails 12. Guide rails 12 are substantially opposed to one another. Roller assemblies 20 may include rollers that roll along guide rails 12 to allow translating motion between the sled member 2 and spine member 5.

Figure 2:
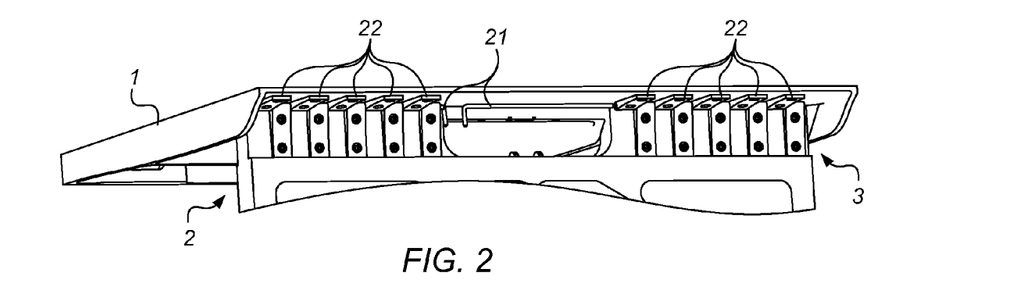
FIG. 2 is a detailed view of the coupling between the table member and a sled member in FIG. 1.

In some embodiments of an aircraft table system, the connection between a table member and a sled member is a direct connection (for example, without any intermediate connecting links between the sled member and the table member). A direct connection may be implemented, for example, with one or more hinges between the table member and the sled member. A direct connection may provide a stronger, stiffer, and/or lower-profile system than systems that include intermediate members such as linkages or mechanisms between a table member and other structural elements of an aircraft table system. In the embodiment shown in FIG. 1, table member 1 is pivotally coupled to sled member 2. Hinges 3 connect table member 1 to sled member 2. In one embodiment, hinges 3 are each at least about one inch or more in length. In the embodiment shown in FIG. 1 (and in greater detail in FIG. 2), hinges 3 are quick disconnect hinges including male component 21 and female component 22. (In FIG. 2, male component 21 for the right hinge 3 is shown removed for illustrative purposes). A quick disconnect hinge may increase serviceability of an aircraft table system. In other embodiments, a hinge between table member 1 and sled member 2 may be a permanent hinge (for example, with a hinge welded or riveted to the members). In alternate embodiments, a sled member and a table member may be connected to each other by way of intermediate links, rods, rails, spacers, gears, rack and pinion, or other elements.

Figure 3:
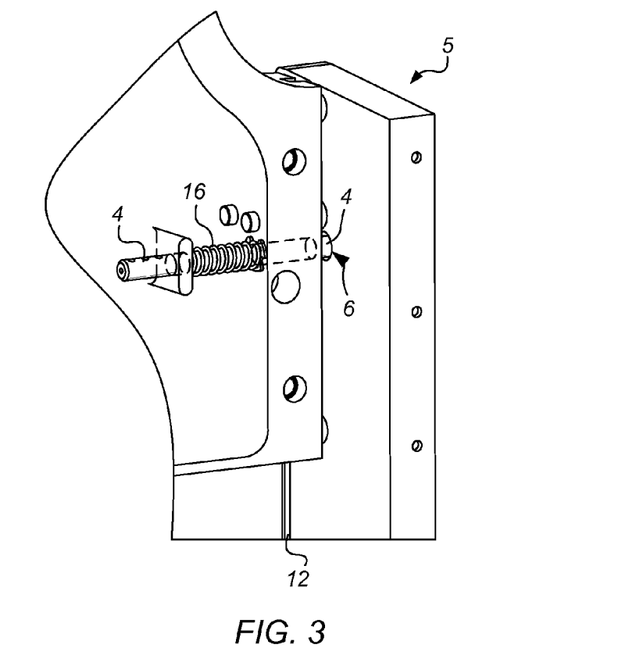
FIG. 3 is a detailed view of the spring-loaded bolt in FIG. 1.

In some embodiments, an aircraft table system includes one or more movable bolts coupled to a sled member. The position of the movable bolts may be selectively controlled to engage supporting structure and maintain the sled member and table member at a desired height. For example, as is shown in FIGS. 1 and 3, sled member 2 carries bolts 4. Spine member 5 includes holes 6. Holes 6 are of suitable dimensions and location to receive bolts 4 carried by sled member 2 when bolts 4 are at the same height as holes 6. Bolts 4 and corresponding holes 6 may be positioned on each of the opposing sides of sled member 2. Bolts 4 are each coupled to one of springs 16. Springs 16 may urge bolts 4 toward the outer rails of spine member 5 (away from a centerline of sled member 2).

Referring again to FIG. 1, aircraft table system 100 includes cables 7. One of cables 7 is coupled to each of bolts 4 carried by sled member 2. One end of each of cables 7 is coupled to a respective one of bolts 4 and the other end of the cable is coupled to table member 1. The attach point 80 of cables 7 to table member 2 may be offset relative to a pivot axis between table member 1 and sled member 2. When a user raises table member 1, table member 1 may pull on cables 7 at the ends of the cables attached to table member 1, which, in turn, increases a pulling load of cables 7 on bolts 4. Conversely, when a user lowers table member 1, table member 1 may slacken cables 7 at the ends of the cables attached to table member 1, which, in turn, decreases a pulling load of cables 7 on bolts 4.

Aircraft table system 100 includes sheaves 9a, 9b, and 9c. Sheaves 9a, 9b, and 9c are carried by sled member 2. Sheaves 9a, 9b, and 9c carry and guide cables 7. In the embodiment shown in FIG. 1, system 100 includes three sheaves that guide each of cables 7. An aircraft table system may, however, include any number of sheaves in various arrangements. In some embodiments, sheaves 9a, 9b, and 9c are rotatably coupled to sled member 2.

In some embodiments, support bolts for a table member automatically engage in a receptacle to support a table member when the table member is adjusted to a deployed position (e.g., a horizontal position). In some embodiments, supporting bolts for a table member may automatically disengage from a receptacle when a table member is adjusted from a deployed position to an undeployed position (e.g., from a horizontal position to a vertical position). For example, bolts 4 may automatically engage in holes 6 when table member 1 is deployed, and bolts 4 may automatically disengage from holes 6 when table member 1 is adjusted from the deployed position in preparation for stowage.

In some embodiments, an aircraft table system includes a cable-tensioning mechanism. A cable tensioning mechanism may add tension to, and/or release tension from, a cable or cables used to control the position of a table. For example, in the embodiment shown in FIG. 1, sheaves 9a, 9b, and 9c are part of cable tensioning mechanisms 50 (one on each side of sled member 2). Each cable tensioning mechanism 50 includes spring-loaded arm 10. Each spring-loaded arm 10 is pivotally coupled to sled member 2. Each cable-tensioning mechanism 50 also incorporates sheaves 9a, 9b, and 9c. Sheave 9a is coupled at or near the end of spring-loaded arm 10. Sheave 9b is coupled to spring-loaded arm 10 at the point where spring-loaded arm 10 pivots relative to sled member 2. Sheave 9c is coupled to sled member 2 below sheaves 9a and 9b. As previously described, for each of cables 7, one end of the cable is coupled to a spring-loaded bolt 4 and the other end is coupled to the underside of table member 2 (as shown, for example, at attach point 80 in FIG. 7A). Each of cables 7 passes over arcuate guide 18, as well as the set of sheaves 9b, 9a, and 9c in alternating fashion. Spring-loaded arm 10 may bias sheave 9a so as to add tension to cables 7. In some embodiments, spring-loaded arm 10 may also allow sheaves 9a to move so as to relieve tension in cables 7. A cable-tensioning mechanism may provide a desired minimum amount of tension on one or more cables during various stages of deployment and use of an aircraft table system. For example, cable-tensioning mechanisms 50 may slow the descent of table member 2 as table member 2 is lowered from a raised position to a deployed (e.g., horizontal) position, such as by the force applied by a user, by gravity, or a combination thereof.

Figure 4:
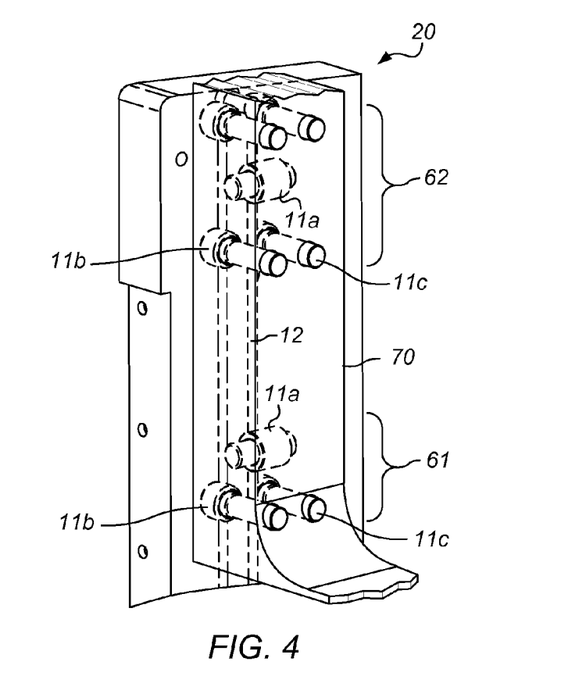
FIG. 4 is a detailed view of the rollers in FIG. 1.

In various embodiments, a sled member for an aircraft table system may include rollers. The rollers may facilitate translation of the sled member. As described above relative to FIG. 1, sled member 2 includes roller systems 20. FIG. 4 illustrates a roller assembly for a sled member according to the embodiment shown in FIG. 1. Roller system 20 includes rollers 11 and roller housing 70. In the embodiment shown in FIG. 1, roller housing 70 is integral to the main structure of sled member 2. In other embodiments, a roller housing may be a separate component that is mounted to the structure of sled member 2. As is illustrated by FIG. 4, rollers 11 may roll along guide rail 12 of spine member 5. Rollers 11 may be grouped into one or more sets of rollers. Additionally, roller system 20 includes a roller, namely roller 11a, in each set that rolls along the edge surface of guide rail 12, another roller, namely roller 11b, of the set that rolls along the front surface of guide rail 12, and a third roller, namely roller 11c, that rolls along the back surface guide rail 12. In certain embodiments, rollers 11a and/or rollers 11b/11c are arranged in conjunction with guide rails 12 of spine member 5 to support the load of sled member 2. For example, in one embodiment, one roller 11a engages a guide rail on either side of the sled member, and each rail carries a portion of the weight of the sled member.

The number of sets of rollers may at least be equal to the number of guide rails 12. In an embodiment, each guide rail 12 is loaded with at least one set of rollers. In certain embodiments, the sets of rollers roll on respective portions of guide rails 12. In some embodiments, a sled member includes at least one upper set and at least one lower set of rollers. For example, as shown in FIG. 4, roller assembly 20 includes roller sets 61 and 62 in which roller set 62 is above roller set 61. Rollers sets 61 and 62 may be arranged in conjunction with guide rail 12 to stabilize the sled member 2 relative to spine member 5.

In some embodiments, an aircraft table system includes one or more mechanisms to assist in lifting and/or lowering a table member and/or sled member. In some embodiments, an aircraft table system includes one or more mechanisms that enhance user control of the system during deployment and/or mitigate or dampen loads imposed on, or by, the system during use, deployment, or stowing of the table.

Figure 5:
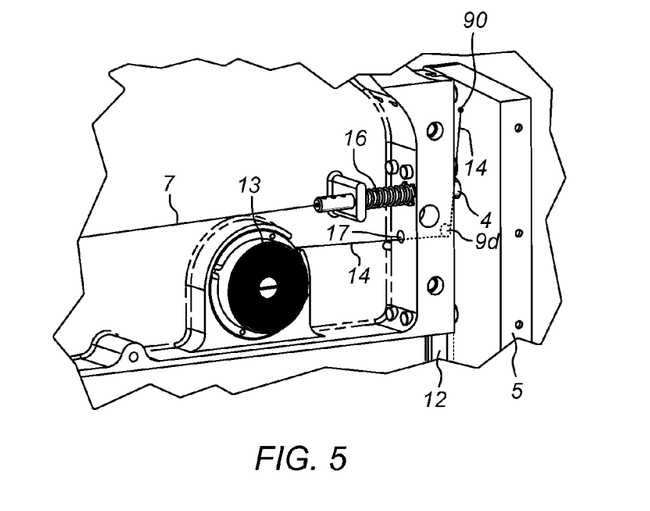
FIG. 5 is a detailed view of the spring reel elements in FIG. 1.

Referring again to FIG. 1, system 100 includes spring reel elements 13 and cables 14. FIG. 5 is a detailed view illustrating an arrangement of spring reel element 13 and cable 14. Spring reel elements 13 may be rotatably coupled to sled member 2. One end of each of cables 14 is coupled to spine member 5 at attach point 90. The other end of each of cables 14 is wrapped on one of spring reel elements 13. From each spring reel element 13, cable 14 extends through aperture 17 in sled member 2, over sheaves 9d, and then terminates on spine member 5 at attach point 90. Spring reel element 13 may maintain tension on cable 14. During raising and lowering of sled member 2, each of cables 14 bears on its respective sheave 9d. Sheaves 9d may convert pulling force from the spring reel elements 13 imparted on the cables 14 at least partially into an upward force on sled member 2.

In some embodiments, spring reel elements 13 are biased to pull on the coupled cables 14 and impart an upward force on sled member 2 as sled member 2 translates along the spine member 5 to assist in displacing the sled member 2 to an upper sled position. Spring reel elements 13 may also impart a force resisting the displacement of the sled member 2 to the lower sled position. The resisting force may control the motion of retraction, for example, so as to avoid a free fall of the sled member 2.

In some embodiments, the force of the spring reel elements 13, in conjunction with the one or more rollers 11 cooperating with at least one of the guide rails 12, may suspend the sled member 2 at a given height in the absence of an applied external force. For example, if a user is interrupted while raising table member 1, table member 1 may remain suspended until the user resumes raising the table member.

As illustrated in FIG. 1, spring reel elements 13 may be arranged symmetrically around a central axis of the sled member 2. A symmetrical arrangement may help ensure that the sled member 2 is balanced through translation.

In various embodiments, a method of deploying an aircraft table includes displacing (e.g., raising) the table member and adjusting the table member from an undeployed position to a fully deployed position. FIGS. 6A-C, 7A-7H, and 8A-8C illustrate aircraft table system 100 in various stages of deployment and use. FIGS. 6A-6C illustrate table member 1 and sled member 2 being raised from a stowed position to a raised vertical position. FIGS. 7A-7H illustrate lowering table member 1 to a deployed position. FIGS. 8A-8C illustrate table member 1 and sled member 2 being lowered from a raised vertical position to a stowed position.

Sled member 2 rolls on guide rails 12, via rollers 11, as table member 1 is raised from a lower position to an upper position or lowered from the upper position to the lower position. In some embodiments, the lower position is a stowed position.

Sled member 2 may automatically lock as table member 1 is adjusted to a deployed position. Sled member 2 may automatically unlock as table member 2 is adjusted from the deployed position to an undeployed position. Locking and unlocking of the sled member 2 may be facilitated by cable-tensioning mechanism 50.

In FIG. 6A, sled member 2 and table member 1 are in a stowed condition in spine member 5. A user may lift table member 1 such that sled member 2 slides up on guide rails 12 through the intermediate position shown in FIG. 6B and to a fully raised position as shown in FIG. 6C.

FIGS. 7A-7H illustrates adjusting table member 1 from a partially undeployed position to a fully deployed position (in this case, from a vertical position to a horizontal position). Deploying table member 1 to the fully deployed position includes pivoting table member 1 downward with respect to sled member 2. In FIGS. 7A-7H, consider section 7a as the portion of cable 7 between attach point 80 and arcuate guide 18. Consider section 7b as the portion of cable 7 between arcuate guide 18 and sheave 9b. Additionally, consider section 7c as the portion of cable 7 between sheaves 9b and 9a. Consider section 7d as the portion of cable 7 between sheaves 9a and 9c. Finally, consider section 7e as the portion of cable 7 between sheave 9c and the end of cable 7 coupled to bolt 4.

When table member 1 is in an undeployed position (such as shown in FIGS. 7A-7B), section 7a is held in tension due to the raised condition of attach point 80. At this time, tension from section 7a is equally imparted on section 7b as well as sections 7c and 7d, partially overcoming the bias of spring-loaded arm 10. Additionally, while spring-loaded arm 10 is held in place, the tension in section 7d is equally imparted on section 7e, holding bolt 4 in a retracted position relative to hole 6. As table member 1 is moved to an at least partially deployed position (such as shown in FIGS. 7C-7D), attach point 80 is moved closer to arcuate guide 18, releasing tension in cable 7. Initially, while the tension in cable 7 is sufficient to hold spring-loaded arm 10 in place, the release of tension in section 7a causes relief in sections 7b, 7c, 7d, and 7e, allowing bolt 4 to enter hole 6 of spine member 5. Once bolt 4 has entered hole 6, sled member 2 is supported on bolt 4. From this point (such as shown in FIGS. 7E-7H), as table member 1 is further adjusted to a horizontal position and tension is further released from section 7a, the bias of spring-loaded arm 10 pulls sections 7c and 7d, via sheave 9a, to take up any slack in cable 7. Once table member 1 reaches the horizontal position, aircraft table system 100 is fully deployed.

When aircraft table system 100 is no longer needed, table member 1 may be returned to a stowed position. To stow table member 1, table member 1 may be returned from a horizontal position a vertical position. During return of table member 1, the positions of table member 1 and various elements of aircraft table system 100 may be as illustrated in FIGS. 7A-7H, though in reverse order, with the position of the table member progressing from a starting at a horizontal position as shown in FIGS. 7G-7H to a vertical position as shown in FIGS. 7A-7B. As table member 1 is raised to the vertical position, attach point 80 is raised, putting tension on cable 7. Cable 7 may pull bolt 4 to a retracted position relative to hole 6. Once bolt 4 is retracted from hole 6, table member 1 and sled member 2 may be lowered into a stowed position as shown in FIGS. 8A-8C.

As is illustrated by FIGS. 6A-6C and FIGS. 8A-8C, table member 1 may be raised and lowered on sled member 2. In some embodiments, elements of an aircraft table system may provide an upward force to assist a user in raising a table member and/or retard descent of the table member. For example, an upward force may be provided by the spring reel elements 13 configured to pull on one or more provided cables 14.

In the embodiment of the aircraft table system illustrated in FIG. 1, various elements such as bolts, sheaves, roller assemblies, spring reel elements, and guide rails, are provided in mirrored pairs, with one element on the left side of the system and a corresponding element on the right side of the system. It will be understood, however, that in various embodiments, an aircraft table system may include one or more of the disclosed elements on only one side of the system. For example, an aircraft table may include a retractable bolt mechanism on the left side of the system but not on the right side. Further, an aircraft table system might include more than one of an element on one side of the system. For example, an aircraft table system might include two or more bolts on the right side of the system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims. Terms relating to orientation, such as "upper", "lower", "top", "bottom", "left", or "right", are used for reference only; the device herein may be used in any orientation.

What is claimed is:

1. An aircraft table system, comprising:
   a table member configured to move reversibly from an at least partially undeployed position to an at least partially deployed position;
   a sled member coupled to the table member;
   one or more sets of rollers coupled to the sled member, wherein at least one roller of at least one of the sets of one or more rollers comprises a pin and a rolling member on the pin, wherein the pin supports the rolling member with respect to the sled member; and
   one or more guide rails,
   wherein the rolling member of at least one of the one or more rollers comprises an exterior surface that contacts and rolls on at least one of the one or more guide rails such as to allow relative translating motion between the sled member and at least one of the one or more guide rails,
   wherein at least one of the one or more sets of rollers comprises:
   at least one roller configured to roll along a front surface of at least one of the guide rails; and
   at least one roller configured to roll along a back surface of the at least one guide rail,
   wherein the at least one guide rail is sandwiched between the at least one roller configured to roll along the front surface of the guide rail and the at least one roller configured to roll along a back surface of the guide rail.

2. The system of claim 1, wherein the at least partially deployed position is substantially horizontal.

3. The system of claim 1, further comprising a spine member, wherein the spine member comprises at least one pair of guide rails.

4. The system of claim 1, wherein the table member is pivotally coupled to the sled member.

5. The system of claim 1, further comprising one or more hinges configured to pivotally couple the table member to the sled member, wherein at least one of the one or more hinges is a quick disconnect hinge comprising a male component and a female component.

6. The system of claim 1, further comprising one or more hinges configured to pivotally couple the table member to the sled member, wherein the length of at least one of the one or more hinges is at least about one inch.

7. The system of claim 1, wherein the at least one set of the one or more sets of rollers is configured support the load of the sled member and the table member.

8. The system of claim 1, wherein at least one set of the one or more sets of rollers comprises at least one roller configured to roll along an edge surface of at least one of the guide rails.

9. The system of claim 1, wherein the one or more sets of rollers comprise at least one upper set of rollers configured to roll on one portion of at least one of the guide rails and at least one lower set of rollers configured to roll on another portion of the at least one guide rail.

10. The system of claim 1, further comprising:
a spine member coupled to and supporting at least one of the one or more rails;
one or more spring reel elements rotatably coupled to the sled member;
one or more cables, wherein at least one of the cables comprises a portion coupled to the spine member and at least one other portion coupled to at least one of the spring reel elements.

11. The aircraft table system of claim 1, further comprising a mechanism configured to lock the sled member when the table member is deployed, wherein the mechanism comprises a bolt that is movable to engage in one or more openings to lock the sled member relative to the guide rails, wherein the table member is connected to the bolt such that a user's adjusting of the table member from a deployed position to an at least partially undeployed position displaces the bolt of the locking mechanism to release the locking mechanism so that the table member can be lowered by the user into a stowed position.

12. An aircraft table system, comprising:
a table member configured to move reversibly from an at least partially undeployed position to an at least partially deployed position;
a sled member coupled to the table member;
one or more rollers coupled to the sled member, wherein at least one of the rollers comprises a pin and a rolling member on the pin, wherein the pin supports the rolling member with respect to the sled member;
one or more guide rails,
a spine member comprising one or more holes;
one or more bolts carried by the sled member; and
one or more cables;
wherein the rolling member of at least one of the one or more rollers comprises an exterior surface that contacts and rolls on at least one of the one or more guide rails such as to allow relative translating motion between the sled member and at least one of the one or more guide rails,
wherein at least a portion of at least one of the one or more cables is coupled to at least one of the one or more bolts; and
wherein the sled member and the at least one bolt are configured such that when the table member is adjusted to the at least partially deployed position, the at least one bolt is received by at least one of the one or more holes of the spine member such that the sled member and the table member are at least partially supported by the spine member on the at least one bolt, and wherein at least a portion of at least one of the one or more cables is coupled to the table member such that when the table member is adjusted to the at least partially undeployed position, the at least one bolt is pulled from the at least one hole of the spine member, allowing the sled member to move relative to the spine member.

13. The system of claim 12, wherein the at least partially deployed position is substantially horizontal.

14. The system of claim 12, wherein the table member is pivotally coupled to the sled member.

15. The system of claim 12, further comprising a mechanism configured to lock the sled member when the table member is deployed, wherein the mechanism comprises a bolt that is movable to engage in one or more openings to lock the sled member relative to the guide rails, wherein the table member is connected to the bolt such that a user's adjusting of the table member from a deployed position to an at least partially undeployed position displaces the bolt of the locking mechanism to release the locking mechanism so that the table member can be lowered by the user into a stowed position.

16. An aircraft table system, comprising:
a table member configured to move reversibly from an at least partially undeployed position to an at least partially deployed position;
a sled member coupled to the table member;
a plurality of rollers coupled to the sled member;
one or more pairs of guide rails configured to mount to a structure in an aircraft;
a spine member comprising one or more holes, wherein the spine member comprises the at least on pair of guide rails;
two or more bolts carried by the sled member; and
two or more cables;
wherein at least one of the rollers comprises a pin and a rolling member on the pin, wherein the pin supports the rolling member with respect to the sled member, wherein the rolling member of at least one of the one or more rollers comprises an exterior surface that contacts and rolls on one or more of the guide rails such as to allow relative translating motion between the sled member and the at least one pair of guide rails,
wherein at least a portion of a first one of the cables is coupled to at least a first one of the bolts;
wherein at least a portion of a second one of the cables is coupled to at least a second one of the bolts, and
wherein the sled member and at least one of the bolts are configured such that when the table member is adjusted to the at least partially deployed position, the at least one bolt is received by at least one of the one or more holes of the spine member such that the sled member and the table member are at least partially supported by the spine member on the at least one bolt, and wherein at least a portion of at least one of the cables is coupled to the table member such that when the table member is adjusted to the at least partially undeployed position, the at least one bolt is pulled from the at least one hole of the spine member, allowing the sled member to move relative to the spine member.

17. The system of claim 16, wherein, for at least one pair of the guide rails, one guide rail of the pair is substantially opposed to the other guide rail of the pair.

18. The system of claim 16, wherein at least one of the two or more sets of rollers is configured to support the load of the sled member.

19. The system of claim 16, wherein the at least partially deployed position is substantially horizontal.

20. The system of claim 16, further comprising a mechanism configured to lock the sled member when the table member is deployed, wherein the mechanism comprises a bolt that is movable to engage in one or more openings to lock the sled member relative to the guide rails, wherein the table member is connected to the bolt such that a user's adjusting of the table member from a deployed position to an at least partially undeployed position displaces the bolt of the locking mechanism to release the locking mechanism so that the table member can be lowered by the user into a stowed position.

\* \* \* \* \*